US009011782B2

(12) United States Patent
Baig et al.

(10) Patent No.: US 9,011,782 B2
(45) Date of Patent: Apr. 21, 2015

(54) AFTER-TREATMENT SYSTEM

(75) Inventors: Mirza P. Baig, Peoria, IL (US); Thomas W. Manning, Metamora, IL (US); Rick E. Jeffs, Peoria, IL (US); Kristian N. Engelsen, South Bend, IN (US); Andrew M. Denis, Peoria, IL (US); Pradyumna V. Rao, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 252 days.

(21) Appl. No.: 13/571,053

(22) Filed: Aug. 9, 2012

(65) Prior Publication Data

US 2014/0044612 A1   Feb. 13, 2014

(51) Int. Cl.
| | |
|---|---|
| B01D 50/00 | (2006.01) |
| F01N 3/20 | (2006.01) |
| F01N 3/28 | (2006.01) |
| F01N 13/18 | (2010.01) |
| F01N 3/035 | (2006.01) |
| F01N 3/10 | (2006.01) |
| F01N 13/00 | (2010.01) |

(52) U.S. Cl.
CPC .............. *F01N 3/2066* (2013.01); *F01N 3/035* (2013.01); *F01N 3/103* (2013.01); *F01N 3/2842* (2013.01); *F01N 13/0097* (2014.06); *F01N 13/017* (2014.06); *F01N 13/18* (2013.01); *F01N 2450/00* (2013.01); *F01N 2450/18* (2013.01); *F01N 2450/30* (2013.01); *F01N 2470/14* (2013.01); *F01N 2470/16* (2013.01); *F01N 2470/22* (2013.01); *Y02T 10/24* (2013.01); *Y10T 29/49233* (2015.01)

(58) Field of Classification Search
USPC .......... 422/176, 180; 294/26, 90, 158; 55/523
See application file for complete search history.

(56) References Cited

U.S. PATENT DOCUMENTS

| | | | |
|---|---|---|---|
| 3,891,396 A | 6/1975 | Musall et al. | |
| 4,163,042 A | 7/1979 | Lynch | |
| 5,378,435 A | 1/1995 | Gavoni | |
| 5,436,216 A * | 7/1995 | Toyao et al. | 502/439 |
| 5,832,720 A | 11/1998 | Svahn | |
| 6,568,078 B2 | 5/2003 | Eisenstock | |
| 6,780,292 B2 | 8/2004 | Hermann et al. | |
| 7,132,048 B2 * | 11/2006 | Hagashihara | 210/232 |
| 7,404,254 B2 | 7/2008 | Kurth et al. | |
| 7,517,380 B2 | 4/2009 | Grimm et al. | |
| 7,565,743 B2 | 7/2009 | Whittenberger et al. | |
| 7,918,914 B2 | 4/2011 | Sudmanns et al. | |
| 8,092,748 B2 | 1/2012 | Forster et al. | |
| 2009/0113709 A1 | 5/2009 | Mueller et al. | |
| 2009/0249754 A1 | 10/2009 | Amirkhanian et al. | |

* cited by examiner

*Primary Examiner* — Tom Duong
(74) *Attorney, Agent, or Firm* — Leydig, Voit & Mayer, Ltd.

(57) ABSTRACT

An after-treatment system includes a Selective Catalytic Reduction (SCR) catalyst or a similar aftertreatment unit or brick that may be inserted into the opened end of a sleeve. The aftertreatment brick includes a substrate matrix with catalytic material that extends between a first face and a second face. A mantle is disposed around the substrate matrix and extends between a first rim proximate the first face and a second rim proximate the second face. The mantel may include a overhang extension that extends the first rim of the mantle beyond the first face of the substrate matrix. To enable retrieval of the SCR catalyst from the sleeve, a retrieval feature is disposed on a readily accessible, inner surface of the overhang extension.

8 Claims, 8 Drawing Sheets

AFTER-TREATMENT SYSTEM

TECHNICAL FIELD

This patent disclosure relates generally to an exhaust aftertreatment system for reducing emissions from power systems such as large internal combustion engines and, more particularly, to a system in which individual catalysts or aftertreatment bricks may be occasionally removed and serviced.

BACKGROUND

Power systems, particularly internal combustion engines like diesel engines, gasoline engines and natural gas burning turbines, create a number of byproducts and emissions during operation including nitrogen oxide emissions such as NO and $NO_2$, sometimes represented as $NO_X$. In response to increased government-mandated regulations over such emissions, manufacturers of internal combustion engines have developed measures to reduce the amount or effect of the nitrogen oxides produced by the internal combustion process. One method is a chemical process called selective catalytic reduction, which may be referred to as SCR. In the SCR process, a gaseous or liquid reductant agent is introduced to the exhaust system where the reductant agent can intermix with the exhaust gasses or it can be adsorbed onto a catalyst located in the exhaust system downstream of the internal combustion engine. A common reductant agent is urea, though other suitable substances such as ammonia may be readily used in the SCR process. The $NO_x$ pollutants can react with the reductant agent and the catalyst such that the $NO_x$ is converted into nitrogen ($N_2$) and water ($H_2O$).

The catalyst used in the SCR process may include an internal support structure or substrate matrix that has been treated or coated with an active material that promotes the SCR conversion process. For example, the matrix may be metal or ceramic or a combination like copper zeolite coated with a base metal like vanadium. In a large scale application, multiple catalysts may be disposed in a common housing or module, such as indicated in U.S. Patent Publication No. 2009/0113709 titled "Method of Manufacturing Exhaust Aftertreatment Devices," herein incorporated by reference in its entirety. That application describes a plurality of monolithic substrates that may be wrapped in a support mat and inserted via a soft-stuffing process into a cylindrical housing for retention.

Over time, the active material in SCR catalysts may become depleted or may become deactivated due to other products in the exhaust gasses such as phosphorous or sulfur collecting in the catalyst. Additionally, the substrate matrix is commonly designed as a thin-walled grid or frame that may become damaged. Accordingly, it may be necessary to occasionally remove the SCR catalysts from the exhaust system for repair or replacement. However, where multiple catalysts are included in a housing or module, especially in exhaust systems associated with large power systems, removal and replacement of an individual catalyst may be complicated.

SUMMARY

The disclosure describes, in one aspect, an aftertreatment brick for insertion into a sleeve. The aftertreatment brick includes a substrate matrix extending between a first face and a second face. A mantle is disposed around the substrate matrix. The mantle may extend between a first rim proximate the first face and a second rim proximate the second face. The mantle may further include an overhang extension extending the first rim beyond the first face. To enable retrieval of the aftertreatment brick from the sleeve, the aftertreatment brick can include a retrieval feature disposed on an inner surface of the overhang extension.

In another aspect, the disclosure describes a method of servicing an aftertreatment module when needed. The aftertreatment module includes at least one longitudinal sleeve that extends between an upstream end and a downstream end along a longitudinal axis. The sleeve has an axially aligned opening formed at the upstream end. The method includes accommodating a first aftertreatment brick in the sleeve to be axially aligned along the longitudinal axis. The method further involves retrieving the first aftertreatment brick from the sleeve by engaging a retrieval feature on the first aftertreatment brick and removing the first SCR catalyst axially through the opening.

In yet another aspect, the disclosure describes an aftertreatment module including a plurality of longitudinal sleeves arranged in a bundle. Each of the sleeves extends between an upstream end and a downstream end along a longitudinal axis and includes an opening formed at each of the upstream ends. A plurality of aftertreatment bricks are axially inserted into each sleeve, including at least a first aftertreatment brick disposed toward the upstream end and a second aftertreatment brick disposed toward the downstream end. Each of the aftertreatment bricks includes a substrate matrix and a mantle disposed around the substrate matrix. The mantle may have an overhang extension extending beyond the substrate matrix. Each of the aftertreatment bricks further includes a retrieval feature disposed on the overhang extension. The retrieval feature enables retrieval of the first aftertreatment brick and the second aftertreatment brick from the sleeve axially through the opening of the upstream end.

DETAILED DESCRIPTION

Figure 1:
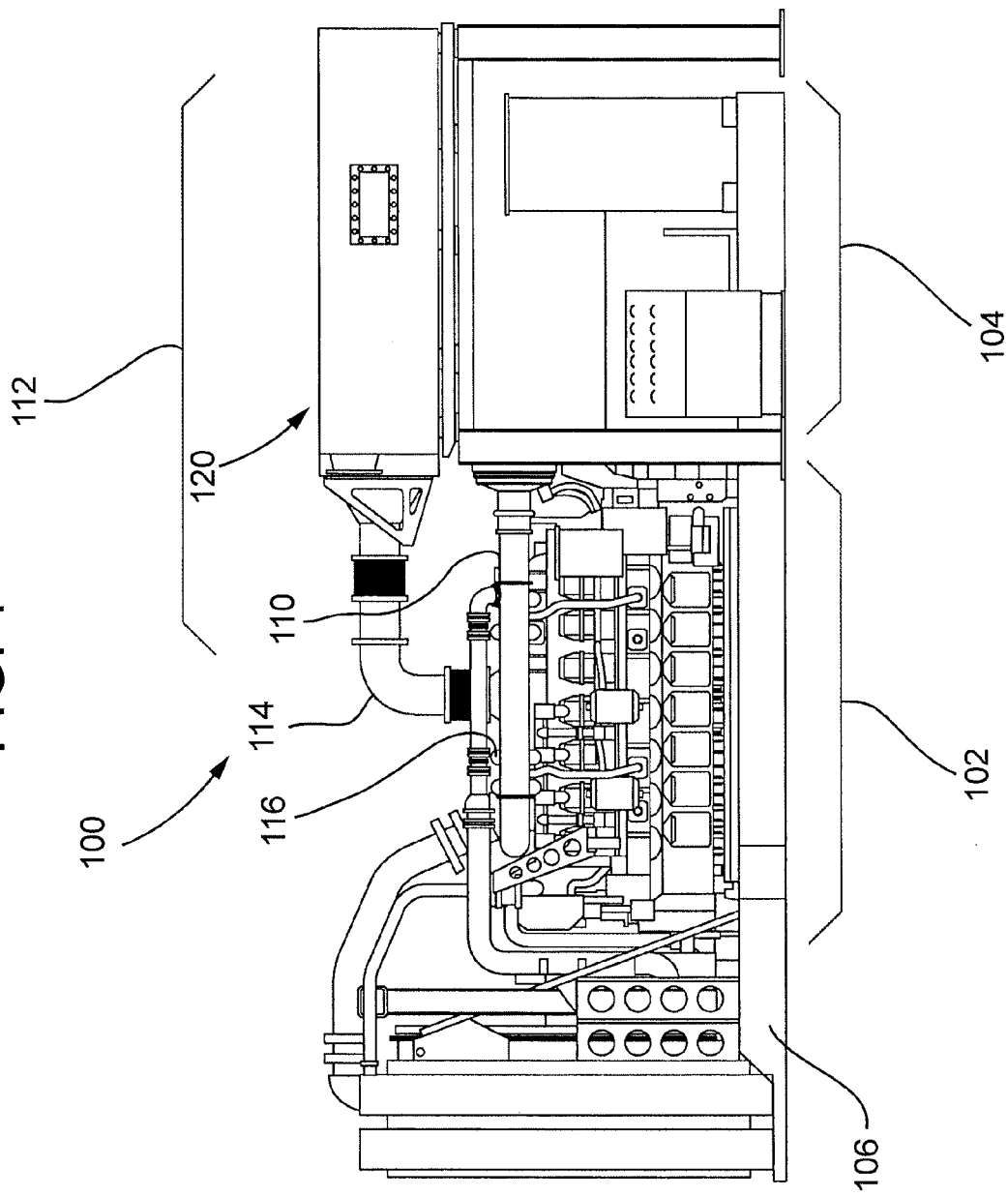
FIG. 1 is a side elevational view of a power system including an internal combustion engine coupled to a generator and associated with a clean emissions module.

This disclosure relates generally to an exhaust after-treatment system and more particularly to catalysts for selective catalytic reduction (SCR) that are adapted to be retrieved from such systems. Now referring to the drawings, wherein like reference numbers refer to like elements, there is illustrated in FIG. 1 a power system 100 that can generate power by combusting fossil fuels or the like. The illustrated power system 100 can include an internal combustion engine 102 such as a diesel engine operatively coupled to a generator 104 for producing electricity. The internal combustion engine 102 may have any number of cylinders as may be appreciated by one of ordinary skill in the art. The internal combustion engine 102 and the generator 104 can be supported on a common mounting frame 106. The power system 100 can provide on-site stand-by power or continuous electrical power at locations where access to an electrical grid is limited or unavailable. Accordingly, the generator 104 and internal combustion engine 102 can be scaled or sized to provide suitable wattage and horsepower. It should be appreciated that in other embodiments, the power system of the present disclosure can be utilized in other applications such as gasoline burning engines, natural gas turbines, and coal burning systems. Further, in addition to stationary applications, the present disclosure can be utilized in mobile applications such as locomotives and marine engines.

To direct intake air into and exhaust gasses from the power system 100, the power system can include an air introduction system 110 and an exhaust system 112. The air introduction system 110 introduces air or an air/fuel mixture to the combustion chambers of the internal combustion engine 102 for combustion while the exhaust system 112 includes an exhaust pipe or exhaust channel 114 in fluid communication with the combustion chambers to direct the exhaust gasses produced by the combustion process to the environment. To pressurize intake air by utilizing the positive pressure of the expelled exhaust gasses, the power system 100 can include one or more turbochargers 116 operatively associated with the air introduction system 110 and the exhaust system 112.

The exhaust system 112 can include components to condition or treat the exhaust gasses before they are discharged to the environment. For example, an exhaust after-treatment system module 120 in the form of a clean emissions module (CEM) can be disposed in fluid communication with the exhaust system 112 downstream of the turbochargers 116 to receive the exhaust gasses discharged from the internal combustion engine 102. The after-treatment module 120 can be designed as a separate unit that can be mounted to the power system 100 generally over the generator 104, for example, and can receive exhaust gasses from the exhaust channel 114. By manufacturing the after-treatment module 120 as a separate modular unit, the design can be utilized with different sizes and configurations of the power system 100. The after-treatment module 120 can be configured to treat, remove or convert regulated emissions and other constituents in the exhaust gasses.

Figure 2:
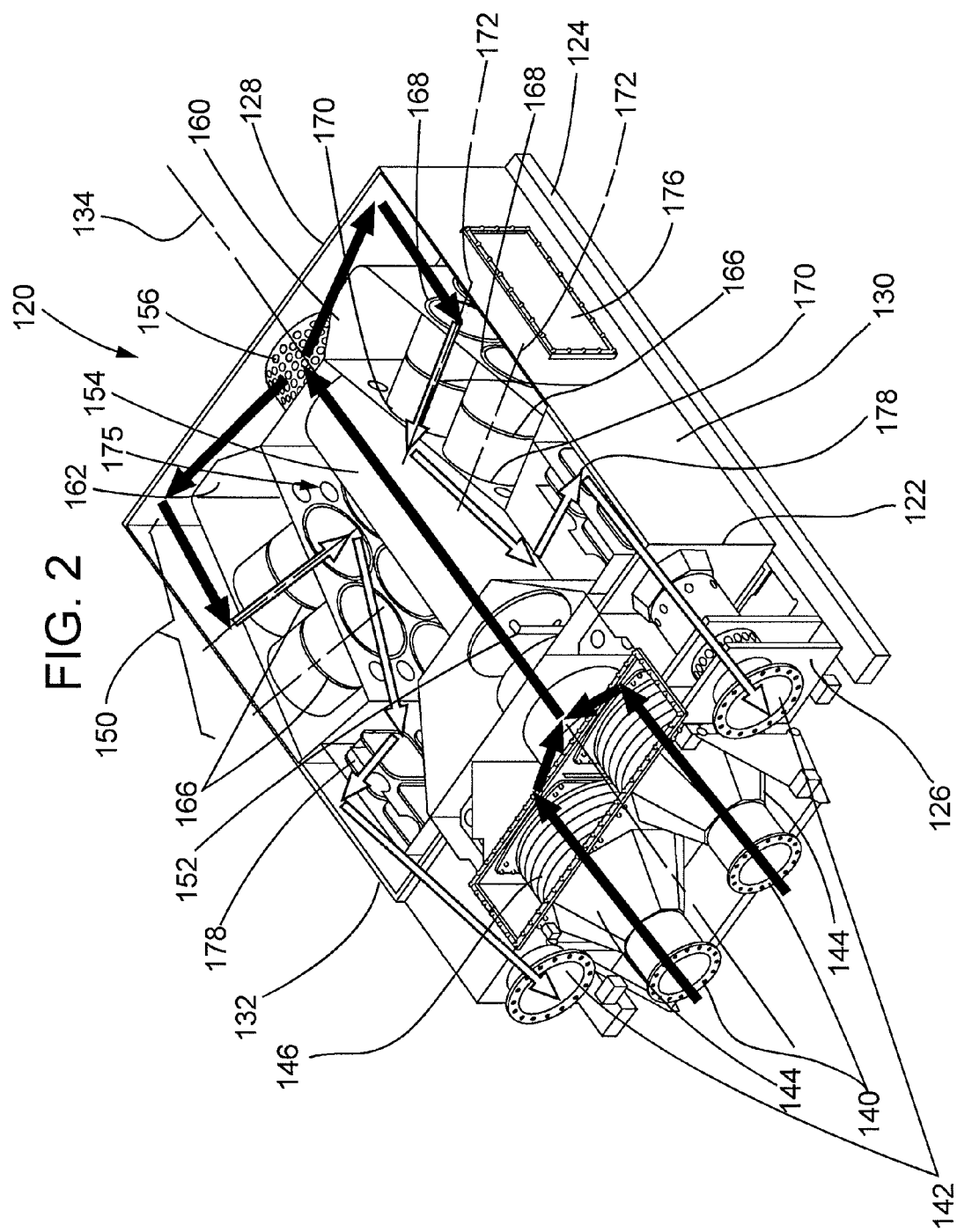
FIG. 2 is a perspective view of the clean emissions module with the top removed to illustrate the components inside of, and the exhaust flow through, the module.

Referring to FIG. 2, the after-treatment module 120 can include a box-like housing 122 that is supported on a base support 124 adapted to mount the after-treatment module to the power system. The box-like housing 122 can include a forward-directed first wall 126, an opposing rearward second wall 128, and respective third and fourth sidewalls 130, 132. However, it should be appreciated that terms like forward, rearward and side are used only for orientation purposes and should not be construed as a limitation on the claims. Additionally, extending between the forward first wall 126 and rearward second wall 128 and located midway between the third and fourth sidewalls 130, 132 can be an imaginary central module axis line 134. The housing 122 may be made from welded steel plates or sheet material.

To receive the untreated exhaust gasses into the after-treatment module 120, one or more inlets 140 can be disposed through first wall 126 of the housing 122 and can be coupled in fluid communication to the exhaust channel from the exhaust system. In the embodiment illustrated, the after-treatment module 120 includes two inlets 140 arranged generally in parallel and centrally located between the third and fourth sidewalls 130, 132 on either side of the module axis line 134 so that the entering exhaust gasses are directed toward the rearward second wall 128. However, other embodiments of the after-treatment module 120 may include different numbers and/or locations for the inlets. To enable the exhaust gasses to exit the after-treatment module 120, two outlets 142 can also be disposed through the first wall 126 of the housing 122. Each outlet 142 can be parallel to the centrally oriented inlets 140 and can be disposed toward one of the respective third and fourth sidewalls 130, 132.

To treat or condition the exhaust gasses, the housing 122 can contain various types or kinds of exhaust treatment devices through or past which the exhaust gasses are directed. For example and following the arrows indicating exhaust flow through the after-treatment module 120, in order to slow the velocity of the incoming exhaust gasses for treatment, the inlets 140 can each be communicatively associated with an expanding, cone-shaped diffuser 144 mounted exteriorly of the front first wall 126. Each diffuser 144 can direct the exhaust gasses to an associated diesel oxidation catalyst (DOC) 146 located proximate the first wall 126 inside the housing 122 that then directs the exhaust gasses to a common collector duct 148 centrally aligned along the module axis line 134. The DOCs 146 can contain materials such as platinum group metals like platinum or palladium which can catalyze carbon monoxide and hydrocarbons in the exhaust gasses to water and carbon dioxide via the following possible reactions:

$$CO + \tfrac{1}{2}O_2 = CO_2 \qquad (1)$$

$$[HC] + O_2 = CO_2 + H_2O \qquad (2)$$

To further reduce emissions in the exhaust gasses and particularly to reduce nitrogen oxides such as NO and $NO_2$, sometimes referred to as $NO_X$, the after-treatment module may include an SCR system 150. In the SCR process, a liquid or gaseous reductant agent is introduced to the exhaust system and directed through an SCR catalyst along with the exhaust gasses. The SCR catalyst can include materials that cause the exhaust gasses to react with the reductant agent to convert the $NO_X$ to nitrogen ($N_2$) and water ($H_2O$). A common reductant agent is urea (($NH_2)_2CO$), though other suitable substances such as ammonia ($NH_3$) can be used in the SCR process. The reaction may occur according to the following general formula:

$$NH_3 + NO_X = N_2 + H_2O \qquad (3)$$

Referring to FIG. 2, to introduce the reductant agent, the SCR system 150 includes a reductant injector 152 located downstream of the collector duct 148 and upstream of a centrally aligned mixing duct 154 that channels the exhaust gasses toward the rearward second wall 128 of the housing 122. The reductant injector 152 can be in fluid communication with a storage tank or reservoir storing the reductant agent and can periodically, or continuously, inject a measure of the reductant agent into the exhaust gas stream in a process sometimes referred to as dosing. The amount of reductant agent introduced can be dependent upon the $NO_X$ load of the exhaust gasses. The elongated mixing duct 154 uniformly intermixes the reductant agent with the exhaust gasses before they enter the downstream SCR catalysts. Disposed at the end of the mixing duct 154 proximate the second wall 128 can be a diffuser 156 that redirects the exhaust gas/reductant agent mixture toward the third and fourth sidewalls 130, 132 of the after-treatment module 120. The third and fourth sidewalls 130, 132 can redirect the exhaust gas/reductant agent mixture generally back towards the front first wall 126.

Figure 3:
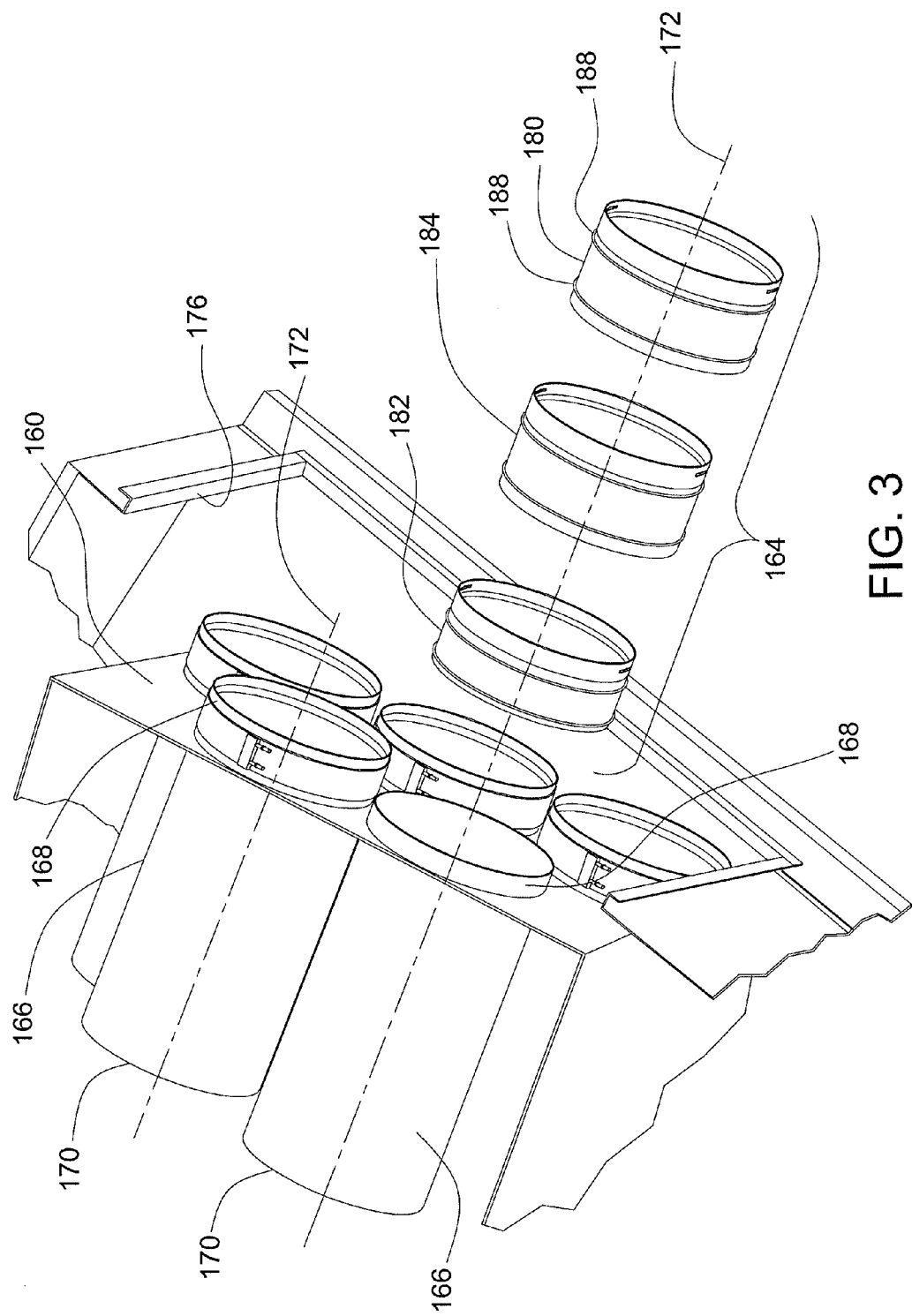
FIG. 3 is a perspective view of an SCR module disposed in the clean emissions module of FIG. 2 that includes at least one sleeve receiving a plurality of SCR catalysts.

To perform the SCR reaction process, the after-treatment module 120 can include a first SCR module 160 disposed proximate the third sidewall 130 and a second SCR module 162 disposed toward the fourth sidewall 132. The first and second SCR modules 160, 162 are oriented to receive the redirected exhaust gas/reductant agent mixture. Referring to FIGS. 2 and 3, the first and second SCR modules 160, 162 can accommodate a plurality of SCR catalysts 164, sometimes referred to as aftertreatment bricks, in one or more sleeves 166. The term aftertreatment brick, however, may refer to a variety of exhaust aftertreatment devices which SCR catalysts are a subset of. The sleeves 166 can be generally elongated, tubular structures having an upstream end 168 and an opposing downstream end 170 aligned along a longitudinal axis 172. In those embodiments that include more than one sleeve in the first and second SCR modules 160, 162, the sleeves can be supported in a truss or frame 174. The frame 174 can be oriented so that the upstream ends 168 are directed toward the respective third and forth sidewalls 130, 132 and the downstream ends 170 communicate with a central region 175 of the after-treatment module 120 generally surrounding but fluidly separated from the mixing duct 154. The central region 175 can direct the treated exhaust gasses forward to the outlets 142 disposed through the front first wall 126. In various embodiments, one or more additional exhaust treatment devices can be disposed in the after-treatment module 120 such as diesel particulate filters 178 for removing soot.

Referring to FIG. 3, to receive the SCR catalysts 164 in the sleeves 166, the upstream end 168 of each sleeve can remain open and unobstructed. As shown in the illustrated embodiment, the catalysts 164 and the sleeves 166 can have complementary cylindrical shapes, although in other embodiments it will be appreciated that the sleeves and catalysts can have other suitable complementary shapes. The catalysts 164 can be aligned along the longitudinal axis 172 and slidably inserted into the sleeves 166. The catalysts 164 can be flow-through devices so that the exhaust gas/reductant agent mixture can pass through them. In those embodiments in which a plurality of catalysts 164 are accommodated per each sleeve 166, the insertion process can involve a first catalyst 180 and a second catalyst 182 that are inserted in such an order that the first catalyst is oriented toward the upstream end 168 and the second catalyst is oriented toward the downstream end 170. In the illustrated embodiment, a third catalyst 184 can be inserted between the upstream first catalyst 180 and the downstream second catalyst 182. The catalysts may have the same or different axial lengths.

To facilitate insertion and removal of the catalysts a 2-3 millimeter gap may exist between portions of the catalysts 164 and the sleeve. Further, to prevent leakage of the exhaust gas/reductant agent mixture through the SCR module, the catalysts 164 and sleeves 166 can be adapted to form a sealing engagement with each other along at least a portion of their engaging peripheries. For example, one or more circular protruding ribs 188 can protrude radially about the circumference of the catalysts 164 that can form a seal with the inner surface of the sleeves 166. To access the SCR modules 160, 162 for insertion or removal of the catalysts 164, a removable access panel 176 can be disposed in the respective third and fourth sidewalls 130, 132 of the housing 122.

As mentioned above, over time the SCR catalysts may become less effective due to deposits of phosphor, sulfur, and other materials from the exhaust gasses building up on the active sites of the catalysts. Additionally, the internal structure of the catalyst might become damaged, preventing flow through it or the seal between the catalyst and the sleeve might fail allowing exhaust gasses to leak through the SCR module untreated. It may therefore become necessary to remove and replace the SCR catalysts from the SCR module. As can be appreciated from FIG. 3, though, the orientation and order of insertion of the catalysts 164 may make retrieval of the catalysts from the sleeves difficult. For example, the second catalyst 182 may be inserted deep into the sleeve 166 from the opened upstream end 168 complicating its retrieval. Likewise, the complementary size and shape and the sealing engagement between the first catalyst 180 and the sleeve 166 may make it difficult to grip or secure the first catalyst. In some embodiments, the catalysts may be relatively heavy, for example, between 13 and 17 kilograms each, thereby further complicating their retrieval. Accordingly, the catalysts 164 can be provided with a retrieval feature that assists in their retrieval and removal from the sleeves 166.

Figure 4:
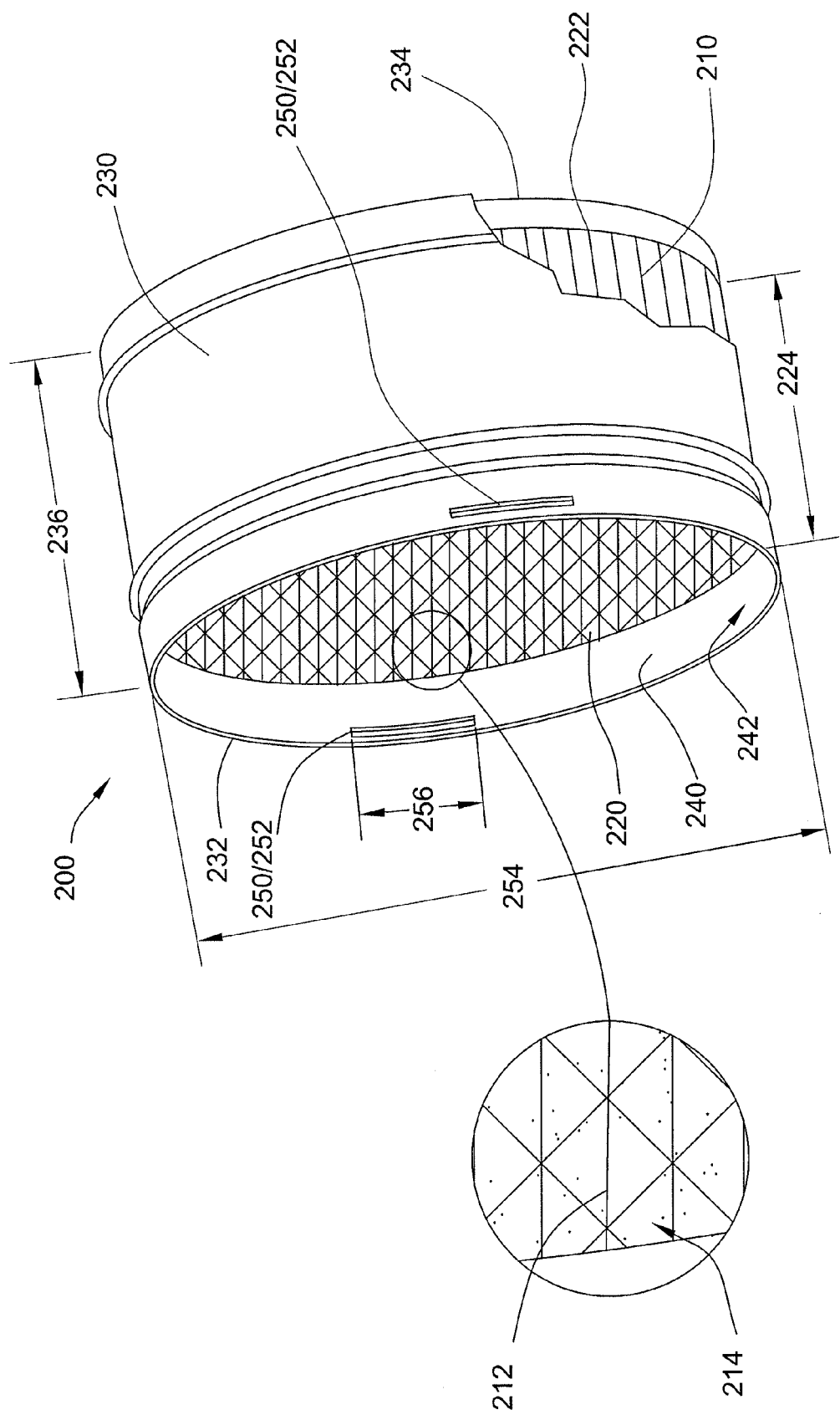
FIG. 4 is a perspective view of an embodiment of an aftertreatment brick, particularly an SCR catalyst, having a retrieval feature in the form of a slot disposed in an overhang extension of the outer mantle of the SCR catalyst with the substrate matrix of the catalyst illustrated in detail.

Referring to FIG. 4, there is illustrated an embodiment of an SCR catalyst 200 of the type for use with the described SCR module that incorporates a retrieval feature to assist in removing the catalyst from the sleeve 166. To support the catalytic material, the catalyst 200 can include an internal substrate matrix 210 made of a triangular lattice, honeycomb lattice, metal mesh substrate, or similar thin-walled support structure 212 onto which the catalytic material or catalytic coating 214 can be disposed. Such designs for the support structures enable the exhaust gas/reductant agent mixture to pass into and through the catalyst. Any suitable material can be used for the support structure 212 including, for example, ceramics, titanium oxide, or copper zeolite. Catalytic coatings 214 that initiate the SCR reaction can include various types of metals such as vanadium, molybdenum and tungsten. The catalytic coating 214 can be deposited on the support structure 212 by any suitable method including, for example, chemical vapor deposition, adsorption, powder coating, spraying, etc. In other embodiments, instead of having separate support structures and catalytic coatings that are often employed together to reduce material costs, the substrate matrix can be made entirely from a catalytic material. In the illustrated embodiment, the substrate matrix 210 has a generally cylindrical shape and extends between a first circular face 220 and a second circular face 222 to delineate a first length 224, however, in other embodiments, different shapes can be applied to the substrate matrix, e.g., square, rectangular, etc. By way of example only, the first length may be about 7 inches long.

To protect the support structure 212, a tubular mantle 230 can be generally disposed around the substrate matrix 210. The tubular mantle 230 can be made of a thicker or more rigid material than the thin-walled support structure 212, such as aluminum or steel. For example, the mantle may be about 1.2 millimeters thick to provide sufficient structural rigidity to the catalyst. The tubular mantle 230 can have a shape complementary to that of the substrate matrix 210 which, in the illustrated embodiment, is generally cylindrical. The cylindrical mantle 230 can therefore extend between a first circular rim 232 and a second circular rim 234. However, in other embodiments the mantle and its first and second rims can have other shapes. The mantle can have a second length 236 delineated between the first rim 232 and a second rim 234 that is slightly larger than the first length 224 of the substrate matrix 210. By way of example only, the second length 236 may be approximately 8 inches. Accordingly, when disposed around the shorter substrate matrix 210, the mantle 230 can have an overhang extension 240 extending beyond at least the first face 220 of the substrate matrix such that the overhang extension displaces the first rim 232 a distance beyond the first face. For the examples given above, the overhang extension 240 may be on the order of one inch, although the disclosure is not limited thereto. In the illustrated embodiment, the overhang extension 240 curves with the circular first rim 232 and includes a cylindrical inner surface 242 extending between the first rim and the first face 220 of the substrate matrix 210.

To facilitate retrieval of the illustrated embodiment of the catalyst 200 from the sleeves of the SCR module, the retrieval feature 250 can be located on the inner surface 242 of the overhang extension 240, a location that is the generally accessible from outside of the first rim 232. In the illustrated embodiment, the retrieval feature 250 can be an elongated, relatively narrow slot 252 disposed along the overhang extension 240 and that can be generally located mid-way between the first rim 232 and the first face 220 of the substrate matrix 210. The slot 252 can have any suitable dimensions relative to the catalyst 200. For example, if the overhang extension 240 is approximately 1 inch in length, the slot 252 can have a width of about 0.125 inches. The slot 252 can extend in a radial direction about part of the circumference of the circular inner surface 242 and the arc length 256 of the slot 252 can be about 5% to 10% of the circumferential dimension of the catalyst 200. For example, if the catalyst 200 has a diameter indicated by arrow 254 of about 14 inches, the circumferential length will be approximately 44 inches and the arc length 256 of the slot can be approximately 2.2 to 4.4 inches. Moreover, although the embodiment illustrate in FIG. 4 depicts two, diametrically opposed slots 252 disposed in the overhang extension 240, in other embodiments, any suitable number of slots can be included. The slots can extend completely through the overhang extension or can be partially recessed into the extension. To form the slot 252, in various embodiments, the slot can be stamped or laser-cut into the mantle 230 either before or after the mantel is disposed about the substrate matrix 210. Possible advantages of laser cutting include a cleaner edge, and that laser cutting is less likely to damage or deform the overhang extension, especially if the slot-forming operation is performed after the mantle has already been disposed around the substrate matrix.

Figure 5:
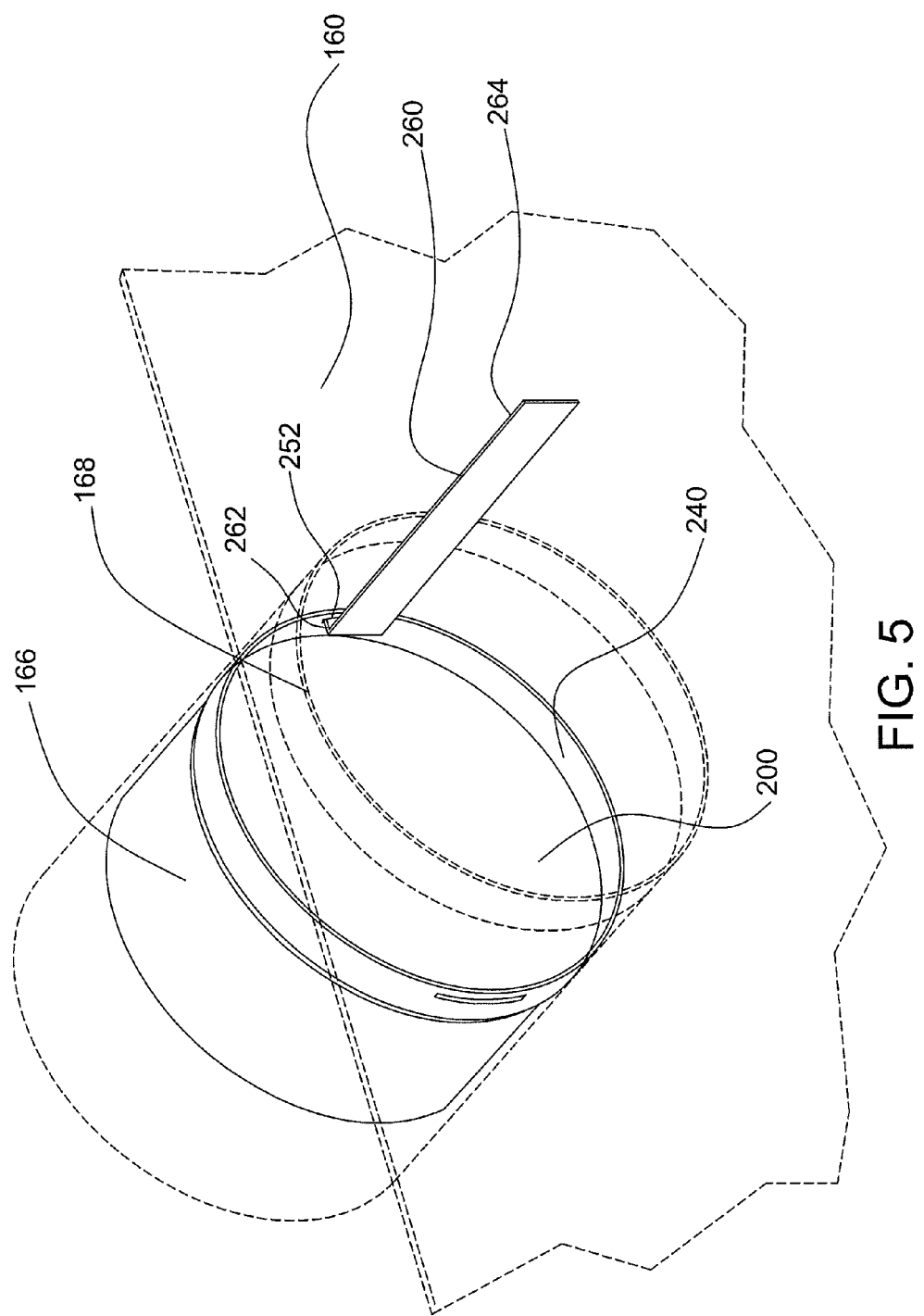
FIG. 5 is a perspective view of the SCR catalyst of FIG. 4 being retrieved from the sleeve of a SCR module, depicted in dashed lines, by a retrieval tool engaged with the slot.

Referring to FIG. 5, the SCR catalyst 200 can be accommodated in a sleeve 166 of the first SCR module 160 such that the overhang extension 240 is oriented toward the opened upstream end 168 of the sleeve. To retrieve the SCR catalyst 200 from within the sleeve 166, the slot 252 can engage with an appropriate retrieval tool 260 that may be inserted through the opened upstream end 168. To engage the slot 252, the retrieval tool 260 can be a generally L-shaped bracket with a distal hook 262 protruding at a right angle from the end of an elongated arm 264 such that the hook can be inserted or received into the slot. The L-shaped retrieval tool can be made from a pressed, elongated blank of sheet or plate metal. Once the retrieval tool engages the slot 252, the catalyst 200 can be pulled from the sleeve 166 through the opened upstream end 168.

Figure 6:
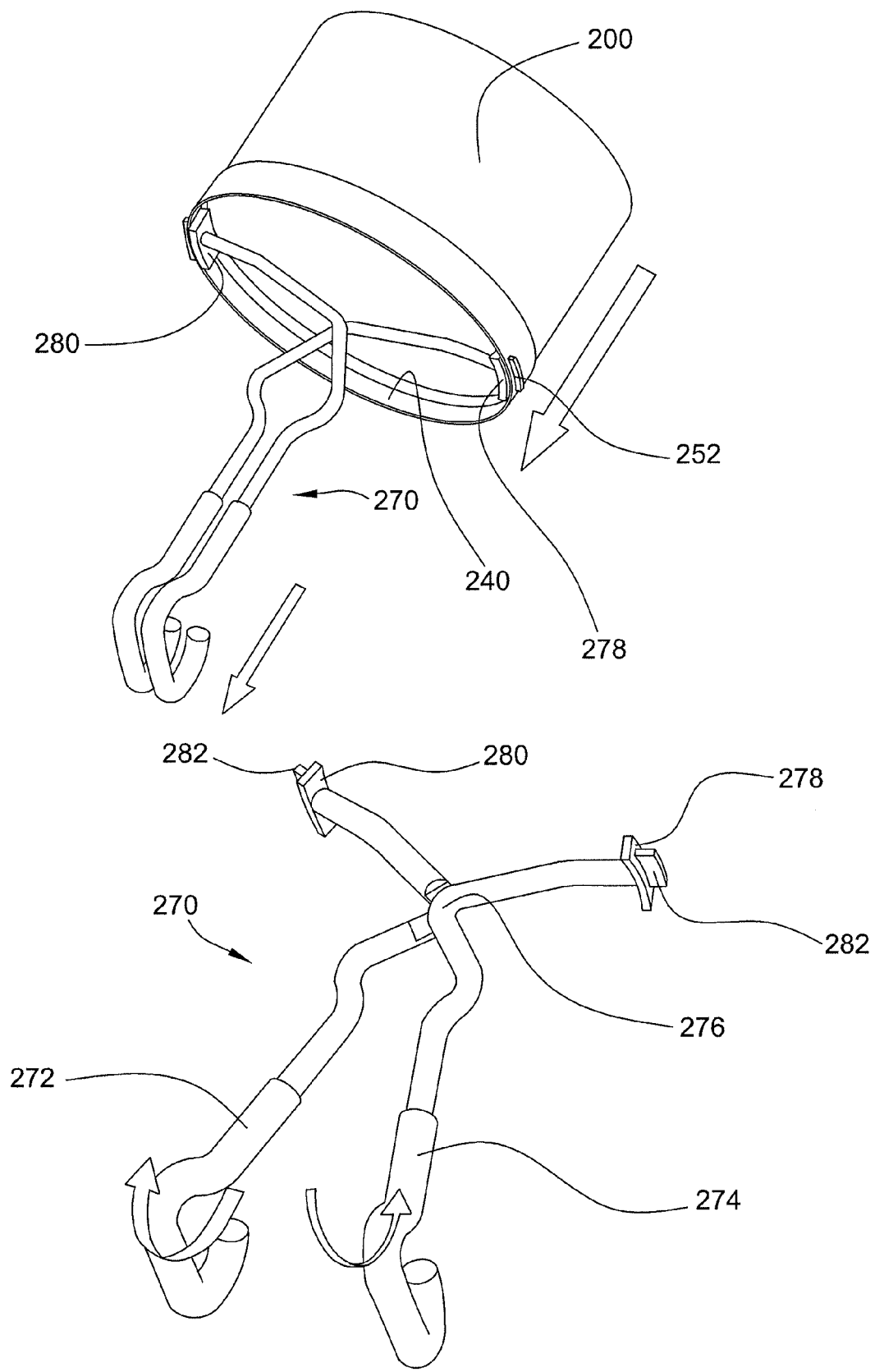
FIG. 6 is a perspective view of another embodiment of a retrieval tool engaging diametrically opposing slots disposed on the SCR catalyst.

Referring to FIG. 6, there is illustrated another embodiment of a retrieval tool 270 that can engage with diametrically opposed slots 252 disposed on the SCR catalyst 200. In this embodiment, the retrieval tool 270 can resemble a pair of inverted forceps or tongs having first and second articulating legs 272, 274 pivotally joined at a pivot point 276. Formed at the opposing first and second distal ends 278, 280 of the respective first and second legs 272, 274 can be a ridge-like rib 282. Handles can be formed in the opposite, proximal ends of the first and second legs 272, 272. Moving the handles of the first and second legs 272, 274 together will cause the first and second distal ends 278, 280 to move apart. Accordingly, when the first and second distal ends 278, 280 are placed within the circumference delineated by the overhang extension 240, the first and second distal ends can be moved apart so that the ribs 282 formed thereon can be received in and engage the diametrically opposed slots 252.

Figure 7:
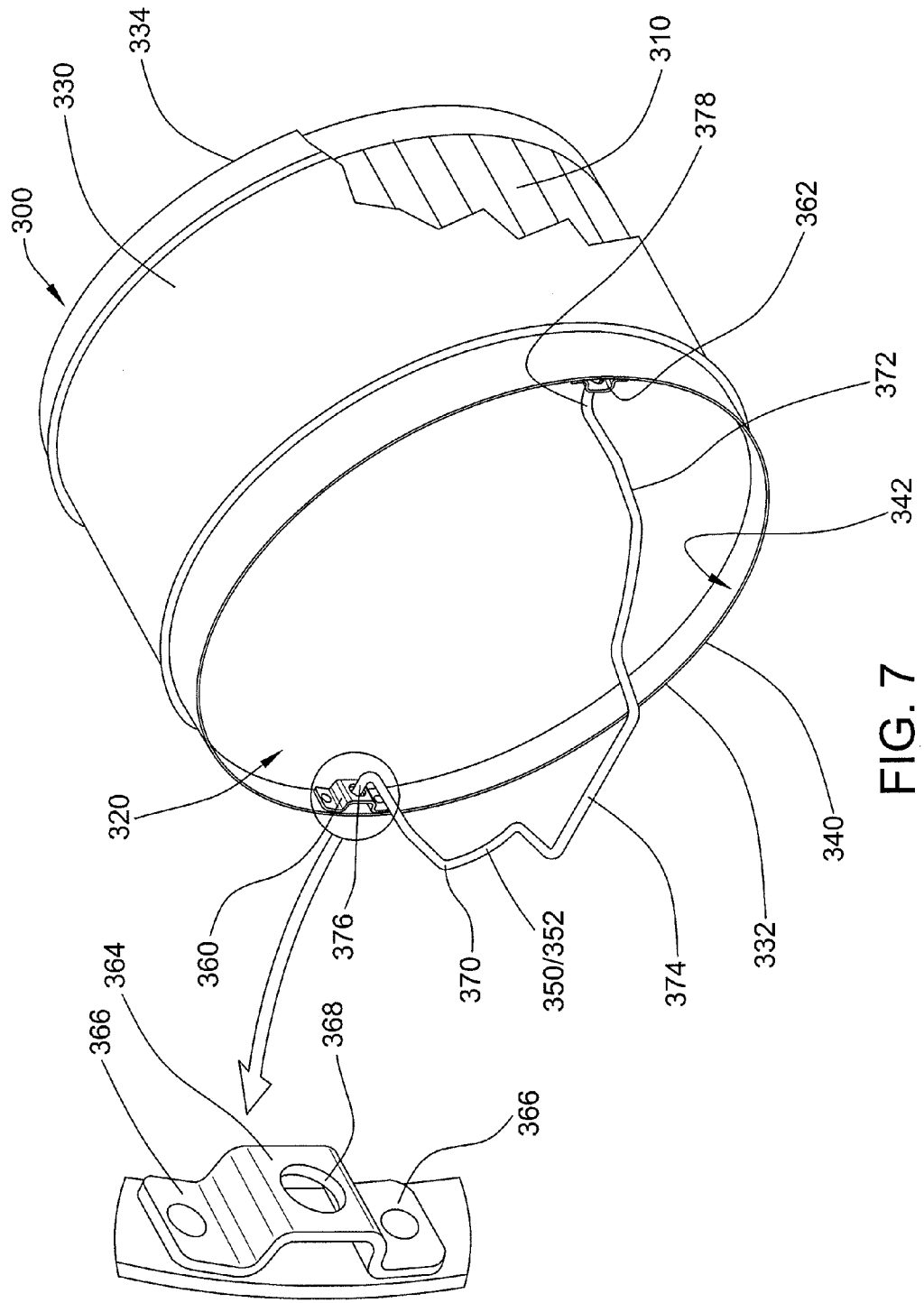
FIG. 7 is a perspective view of another embodiment of the SCR catalyst having a retrieval feature in the form of a handle attached to brackets disposed on the overhang extension with a bracket illustrated in detail.

Referring to FIG. 7, there is illustrated another embodiment of an SCR catalyst 300 having a retrieval feature 350 in the form of a handle 352. The illustrated SCR catalyst 300 can have the same general structure as described above including a substrate matrix 310 with a protective tubular mantle 330 disposed around the substrate matrix that extends between a first rim 332 and a second rim 334. The substrate matrix and mantle can have any suitable shape including cylindrical as illustrated. The tubular mantle 330 can include an overhang extension 340 that offsets the first rim 332 of the mantle from the forward first face 320 of the substrate matrix 310. The overhang extension 340 thereby defines an accessible circumferential inner surface 342. To attach the handle 352 to the catalyst, a first bracket 360 and a second bracket 362 can be disposed on the inner surface 342 of the overhang extension 340. Referring to the detailed view, the first and second brackets 360, 362 can be formed from stamped metal with an offset surface 364 supported between two depending bracket legs 366 and a circular hole 368 disposed through the offset surface. When attached to the inner surface 342 of the overhang extension 340, the first and second brackets 360, 362 can be arranged generally diametrically opposed to each other. The first and second brackets 360, 362 can be attached to the mantle 330 by any suitable method such as welding, riveting or with fasteners.

To form the handle 352, an elongated rod can be bent or formed into an arch-like or curved shape including a first leg 370 and a second leg 372 with the handle therebetween at an apex 374. In the illustrated embodiment, the apex 374 may be formed as a straight grip. To mount the handle 352 to the catalyst 300 utilizing the first and second brackets 360, 362, there can be formed or disposed at the opposing distal ends of first and second legs 370, 372 a respective first and second doweled end 376, 378. The handle 352 is thereby supported across the diameter of the circular first rim 332. The first and second doweled ends 376, 378 can have a size and shape complementary to the circular holes 368 disposed in the first and second brackets 360, 362 so that they can be insertably received into the holes.

In an embodiment, to pivot or articulate the handle 352 with respect to the catalyst 300, the first and second doweled ends 376, 378 can form journals with the holes 368. As illustrated in FIG. 7, the handle 352 can be articulated so that it stands perpendicular to the SCR catalyst 300 to pull the catalyst from the sleeves. Further, the curved shape of the handle 352 can be sized so that it can be set or accommodated within the circumference of the overhang extension 340 when pivoted adjacent to the first face 320 of the substrate matrix 310. Accordingly, multiple catalysts can be aligned and stacked adjacent to each other in the sleeves without the handles interfering. In another embodiment, to obtain the same benefit, the handle 352 can be removed from the catalyst 300 by moving or pressing the first and second legs 370, 372 toward each other so that the first and second doweled ends 376, 378 are removed and released from the respective holes 368 in the first and second brackets 360, 362. The handle can be selectively reattached when necessary to remove the catalyst.

Figure 8:
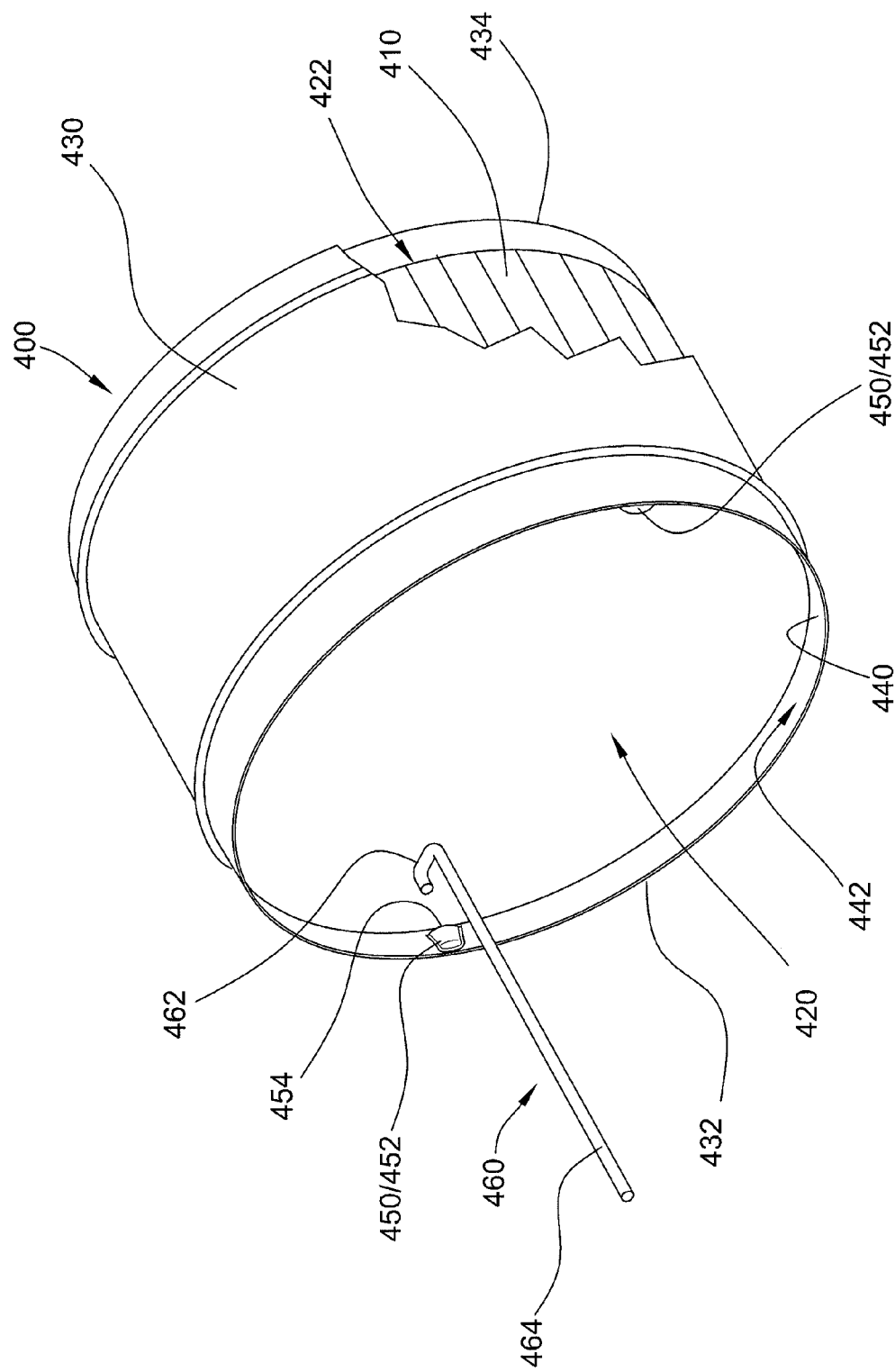
FIG. 8 is a perspective view of another embodiment of the SCR catalyst having a retrieval feature in the form of a catch disposed on the circular overhang extension that is engagable with a retrieval tool.

Referring to FIG. 8, there is illustrated another embodiment of the SCR catalyst 400 equipped with a variation of the retrieval feature 450 for retrieving the catalyst from the sleeve of an SCR module. The catalyst 400 can include a substrate matrix 410 having opposing first and second faces 420, 422 that is surrounded by a tubular mantle 430 extending between a first rim 432 and a second rim 434. The mantle 430 can form an overhang extension 440 extending rearward from the first rim 432 to the first face 420 of the substrate matrix 410. The retrieval feature 450 can be in the form of a pocket-like catch 452 disposed on the cylindrical inner surface 442 of the overhang extension 440. In various embodiments, a plurality of pocket-like catches 452 can be disposed about the cylindrical inner surface 442. The catch 452 can protrude outward from the inner surface 442 and can define an inner pocket that is accessible via a lip 454 that is directed away from the first rim 432 and toward the first face 420 of the substrate matrix 410. To engage the catch 452, a retrieval tool 460 can include a hook 462 disposed at the distal end of an elongated shaft or handle 464 that can be hooked around the lip 454 and partially received in the inner pocket. Pulling the retrieval tool in a particular direction will accordingly pull the SCR catalyst in that direction.

Industrial Applicability

The present disclosure is applicable to retrieval of after-treatment bricks or units accommodated in a large-scale aftertreatment module in the event the aftertreatment bricks require servicing. Although the disclosure describes SCR catalysts in particular, the disclosure can relate to other suitable aftertreatment devices such as diesel oxidation catalysts (DOCs) and/or diesel particulate filters (DPFs) also sometimes referred to as bricks. Referring back to FIGS. 2 and 3, to access the catalysts, an operator can remove the access panel 176 that may be proximately facing the respective first or second SCR module 160/162 inside the after-treatment system 120. Using an elongated tool, the operator can reach through the access panel and insert the tool into the opened upstream end 168 of the elongated sleeves 166 that may be bundled together in the SCR module 160/162. The retrieval tool can engage a retrieval feature disposed on the catalyst in any of the foregoing manners. For example, in the embodiment where the retrieval feature is a slot 252, the retrieval tool can engage the slot and can be retracted to pull the catalyst from the sleeve 166. In those embodiments in which the retrieval feature is a handle, the retrieval tool can be a hook that is inserted into the opened upstream end of the sleeves 166 to hook around the handle. Alternatively, the operator may insert his arm into the sleeves to grasp the handle with his hand.

The disclosure is particularly suited to the retrieval of a plurality of catalysts 164 that may be accommodate in an axially aligned fashion within the same elongated sleeve 166 of the SCR module 160/162. Referring to FIG. 3, it will be appreciated that the second catalyst 182 located deep within the sleeve 166 toward the downstream end 170 can be satisfactorily reached with the elongated retrieval tool. Accordingly, the disclosure enables the ordered insertion and/or extraction of a plurality of SCR catalysts 164 that may be accommodated at different distances from the opened upstream end 168 of the sleeve 166. Moreover, referring to FIG. 4 for example, because the retrieval feature 250 is disposed on the inner surface 242 of the overhang extension 240, it will generally not interfere with adjacent catalysts that may be axially inserted in an abutting relation in the same sleeve, even in those embodiments where the retrieval feature is a pivoting handle. Additionally, the location of the retrieval feature inside the overhang extension helps ensure that it will not interfere with the sleeve surrounding the catalyst. In certain embodiments, the retrieval tool can also assist in inserting new SCR catalysts into the sleeves for replacement purposes after the expended SCR catalysts have been removed.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An aftertreatment brick for insertion into a sleeve disposed in an aftertreatment module, the aftertreatment brick comprising: a substrate matrix extending between a first face and a second face; a mantle disposed around the substrate matrix, the mantle extending between a first rim proximate the first face and a second rim proximate the second face, the mantle including an overhang extension extending the first rim beyond the first face; and a retrieval feature including a first handle extending generally diametrically across the overhang extension and a first bracket and a second bracket disposed on an inner surface of the overhang extension, the first and second brackets diametrically opposed to each other, and an overhang extending generally diametrically across the overhang extension, the retrieval feature enabling retrieval of the aftertreatment brick from the sleeve.

2. The aftertreatment brick of claim 1, wherein the handle includes a first doweled end received in a first hole disposed in the first bracket and a second doweled end received in a second hole disposed in the second bracket; and
   wherein the handle can articulate with respect to the substrate matrix by pivoting the first and second doweled ends in the respective first and second holes.

3. The aftertreatment brick of claim 2, wherein the handle is formed from an elongated rod that includes a curved portion extending between the first and second doweled ends, the curved portion including a first leg and a second leg extending between an apex of the handle to the first and second doweled ends respectively.

4. The aftertreatment brick of claim 3, wherein the handle is removable by moving the first and second legs toward each other to remove the first and second doweled ends from the respective first and second holes.

5. The aftertreatment brick of claim 1, wherein the substrate matrix has a cylindrical shape, the mantle being tubular and disposed around the cylindrical shape of the substrate matrix, and the first rim and the second rim being circular.

6. The aftertreatment brick of claim 1, wherein the aftertreatment brick is an SCR catalyst including a catalytic material in the substrate matrix.

7. An aftertreatment module comprising:
- a plurality of longitudinal sleeves arranged in a sleeve bundle, each of the longitudinal sleeves extending between an upstream end and a downstream end along a longitudinal axis, and an opening formed at the upstream ends of the plurality of longitudinal sleeves;
- a plurality of aftertreatment bricks axially inserted into each longitudinal sleeve including at least a first aftertreatment brick disposed toward the upstream end and a second aftertreatment brick disposed toward the downstream end; and
- each aftertreatment brick including a substrate matrix and a mantle disposed around the substrate matrix, the mantle including an overhang extension extending past the substrate matrix; each of the aftertreatment bricks further including a retrieval feature disposed on the overhang extension, the retrieval feature enabling retrieval of the first aftertreatment brick and the second aftertreatment brick from the longitudinal sleeve axially through the opening of the upstream end.

8. The aftertreatment brick of claim 7, wherein the retrieval feature is selected from the group consisting of a handle; a slot adapted to engage a retrieval tool; and a catch adapted to catch a hook on the retrieval tool.

* * * * *